(12) United States Patent
Podgorny et al.

(10) Patent No.: US 8,019,753 B2
(45) Date of Patent: Sep. 13, 2011

(54) METHOD AND SYSTEM FOR GENERATING A DYNAMIC HELP DOCUMENT

(75) Inventors: Igor A. Podgorny, San Diego, CA (US); Amit Rohatgi, San Diego, CA (US); Paul Coletta, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 438 days.

(21) Appl. No.: 12/209,102

(22) Filed: Sep. 11, 2008

(65) Prior Publication Data

US 2010/0076998 A1    Mar. 25, 2010

(51) Int. Cl.
*G06F 7/00* (2006.01)
*G06F 17/30* (2006.01)
(52) U.S. Cl. ........ 707/722; 707/723; 707/727; 707/728; 715/700; 715/705; 715/708
(58) Field of Classification Search ........................ None
See application file for complete search history.

(56) References Cited

U.S. PATENT DOCUMENTS

| | | | | |
|---|---|---|---|---|
| 7,269,545 | B2 * | 9/2007 | Agichtein et al. ................ | 704/9 |
| 2005/0187919 | A1 | 8/2005 | Takahashi et al. | |
| 2006/0195428 | A1 * | 8/2006 | Peckover ........................... | 707/3 |
| 2006/0253345 | A1 | 11/2006 | Heber ............................. | 705/27 |
| 2008/0104065 | A1 * | 5/2008 | Agarwal et al. ................... | 707/6 |
| 2008/0189197 | A1 * | 8/2008 | Allanson et al. ................ | 705/31 |

FOREIGN PATENT DOCUMENTS

| | | | |
|---|---|---|---|
| JP | 2003006207 A | | 6/2001 |
| JP | 2007149121 A | | 3/2003 |
| KR | 20000064067 A | | 8/2000 |
| WO | 2008/051747 A1 | | 5/2008 |

OTHER PUBLICATIONS

Dick NG'AMBI, "Pre-empting User Questions through Anticipation—Data Mining—FAQ Lists" Proceedings of SAICSIT 2002, pp. 101-109.*
Bast, Holger, Mortensen, Christian W., "Output-Sensitive Autocompletion Search", Springer, Mar. 4, 2008, 18 pages.
Combined Search and Examination Report under Sections 17 and 18(3) for GB0915496.4 dated Dec. 22, 2009 (4 pages).

* cited by examiner

*Primary Examiner* — Mohammad Ali
*Assistant Examiner* — Angelica Ruiz
(74) *Attorney, Agent, or Firm* — Osha • Liang LLP (57) ABSTRACT

A method for generating a dynamic help document involves obtaining question-answer pairs associated with a client-server application, determining rankings of the question-answer pairs based on user feedback about the question-answer pairs, and determining a first preferred question-answer pair based on rankings of question-answer pairs. The method further involves generating the dynamic help document using the first preferred question-answer pair, updating rankings of the question-answer pairs based on additional user feedback about the question-answer pairs, determining a second preferred question-answer pair based on updated rankings of the question-answer pairs, and updating the dynamic help document by replacing the first preferred question-answer pair with the second preferred question-answer pair.

12 Claims, 5 Drawing Sheets

METHOD AND SYSTEM FOR GENERATING A DYNAMIC HELP DOCUMENT

CROSS-REFERENCE TO RELATED APPLICATIONS

Subject matter described herein may be related to subject matter described in U.S. patent application Ser. No. 12/112,516, entitled "Domain Based Interactive Search," in the names of Igor A. Podgorny, Amit Rohatgi, Floyd Morgan, and Paul Coletta, hereby incorporated by reference in its entirety.

BACKGROUND

Users of software applications (whether stand-alone applications or networked applications such as web-based applications) frequently need help understanding the features of applications and/or making optimal use of those features. To provide help in such cases, many software manufacturers offer one or more forms of online (i.e., provided over a network such as a local area network (LAN) and/or the Internet) customer support. Online customer support typically takes one of two forms: a frequently asked questions (FAQ) document and/or a more open-ended question and answer format.

A FAQ document is typically a series of questions and answers that provide detailed information about a limited set of product features—specifically, those features that are thought to be most relevant to the largest number of customers. Features that are relevant to only a small number of customers or that deal with esoteric situations are typically not addressed in FAQ documents. FAQ documents are typically compiled manually by software developers and/or other product experts familiar with the application in question. Because FAQ documents are manually generated, their relevance and accuracy depend on manual updates, for example when new features are added to the application.

Other, more open-ended questions and answers may take many different forms. For example, users may be able to ask questions in an online message forum, where other users (often including software developers and/or other product experts) are able to answer those questions in subsequent messages. Further, users may be able to initiate online chat sessions with customer service representatives, thereby allowing the users to obtain personalized assistance with specific questions. Though generally quite pertinent to the users' concerns, open-ended questions and answers may not be readily available to other users —depending, for example, on whether the questions and answers are stored in a location accessible to other users and the grammatical correctness of the questions and answers.

SUMMARY

In general, in one aspect, the invention relates to a method for generating a dynamic help document. The method involves obtaining a plurality of question-answer pairs associated with a client-server application, determining rankings of the plurality of question-answer pairs based on user feedback about the plurality of question-answer pairs, determining a first preferred question-answer pair based on rankings of the plurality of question-answer pairs, and generating the dynamic help document using the first preferred question-answer pair. The method further involves updating rankings of the plurality of question-answer pairs based on additional user feedback about the plurality of question-answer pairs, determining a second preferred question-answer pair based on updated rankings of the plurality of question-answer pairs, and updating the dynamic help document by replacing the first preferred question-answer pair with the second preferred question-answer pair.

In general, in one aspect, the invention relates to a computer system. The computer system includes a processor, memory, and a help subsystem resident in memory, operating under control of the processor. The help subsystem is configured to obtain a plurality of question-answer pairs associated with a client-server application, determine rankings of the plurality of question-answer pairs based on user feedback about the plurality of question-answer pairs, determine a first preferred question-answer pair based on rankings of the plurality of question-answer pairs, generate the dynamic help document using the first preferred question-answer pair, update rankings of the plurality of question-answer pairs based on additional user feedback about the plurality of question-answer pairs, determine a second preferred question-answer pair based on updated rankings of the plurality of question-answer pairs, and update the dynamic help document by replacing the first preferred question-answer pair with the second preferred question-answer pair.

In general, in one aspect, the invention relates to a computer-readable medium comprising executable instructions for generating a dynamic help document. The executable instructions comprise instructions to obtain a plurality of question-answer pairs associated with a client-server application, determine rankings of the plurality of question-answer pairs based on user feedback about the plurality of question-answer pairs, determine a first preferred question-answer pair based on rankings of the plurality of question-answer pairs, generate the dynamic help document using the first preferred question-answer pair, update rankings of the plurality of question-answer pairs based on additional user feedback about the plurality of question-answer pairs, determine a second preferred question-answer pair based on updated rankings of the plurality of question-answer pairs, and update the dynamic help document by replacing the first preferred question-answer pair with the second preferred question-answer pair.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for generating a dynamic help document. For the purposes of this discussion, the term "dynamic" means that the help document is automatically generated and periodically updated based on systematically determined conditions. Specifically, in one or more embodiments of the invention, the dynamic help document is generated and updated based on the relative rankings of question-answer pairs. In this context, the phrase "automatically generated" means that the dynamic help document is generated under control of software executing in a computer system, without human intervention. In other words, although the question-answer pairs are ranked based on user feedback, humans are not directly involved in generating and updating the dynamic help document.

Figure 1:
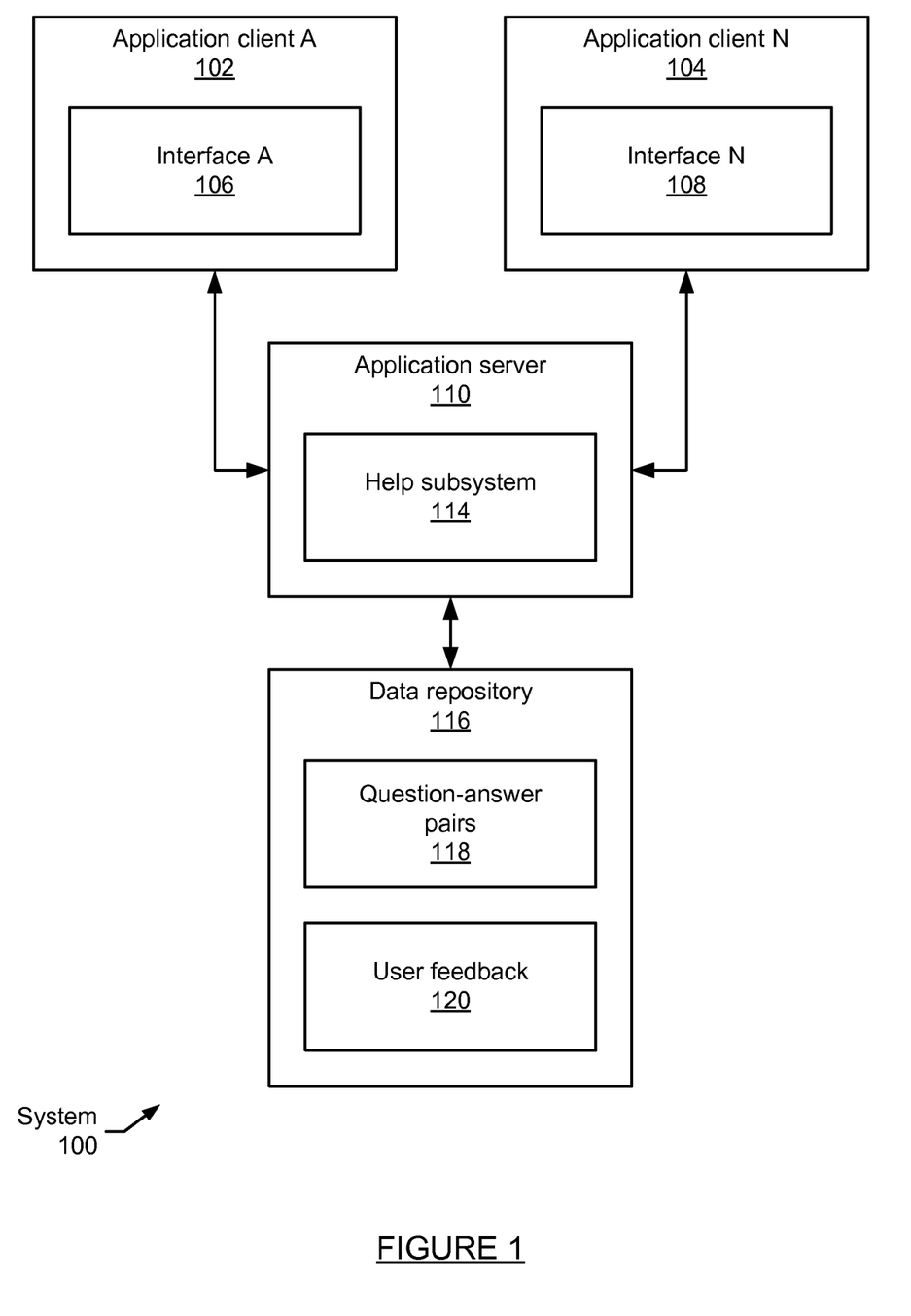
FIG. 1 shows a diagram of a system in accordance with one or more embodiments of the invention.

FIG. 1 shows a diagram of a system (100) in accordance with one or more embodiments of the invention. The system (100) includes a client-server architecture having an application server (110) and multiple application clients (e.g., application client A (102), application client N (104)). Each of the application clients includes an interface (e.g., interface A (106), interface N (108)) through which users access functionality of a client-server application hosted by the application server (110).

Further, in one or more embodiments, the client-server application is an online application and the application clients' interfaces include web browsers or another form of web-based interface. Alternatively, the client-server application may have a stand-alone component resident on the application clients, in addition to a networked component communicatively coupled with the application server (110). For example, some stand-alone applications include access to online help (e.g., chat, message boards, FAQ documents, or any other type of online help). Those skilled in the art will appreciate that many different types of client-server applications and client-server architectures exist.

In one or more embodiments of the invention, the client-server application is an online tax preparation application. Alternatively, the client-server application may be a financial management application (e.g., to manage personal and/or business finances), an application for tracking medical records, a home inventory application, an office productivity application such as a word processor or spreadsheet, or any other type of application in which users may seek application help.

Further, in one or more embodiments, the application server (110) includes a help subsystem (114) configured to provide help functionality for the client-server application. Specifically, the help subsystem (114) is configured to generate and update a dynamic help document using one or more of the methods described below with respect to FIGS. 2 and 3. In one or more embodiments of the invention, the help subsystem (114) is further configured to export the dynamic help document to generate a static help document.

Specifically, in one or more embodiments, the help subsystem (114) is configured to generate and update the dynamic help document using question-answer pairs (118) and user feedback (120) stored in a data repository (116). In one or more embodiments, the question-answer pairs (118) include questions and answers from online message boards, live chat sessions, and/or any other source of questions and answers associated with functionality of the client-server application. Further, in one or more embodiments, the user feedback (120) includes information describing user opinions about the question-answer pairs (118). For example, the user feedback (120) may include numerical ratings of question-answer pairs (118), text reviews of question-answer pairs (118), or any other type of feedback obtained from users of the application clients.

The data repository (116) may include a database, an extensible markup language (XML) document, a spreadsheet, a plain text document, or any other type of format suitable for storing the question-answer pairs (118) and user feedback (120). Further, the data repository (116) may be distributed across multiple storage locations and/or different storage formats.

Figure 2:
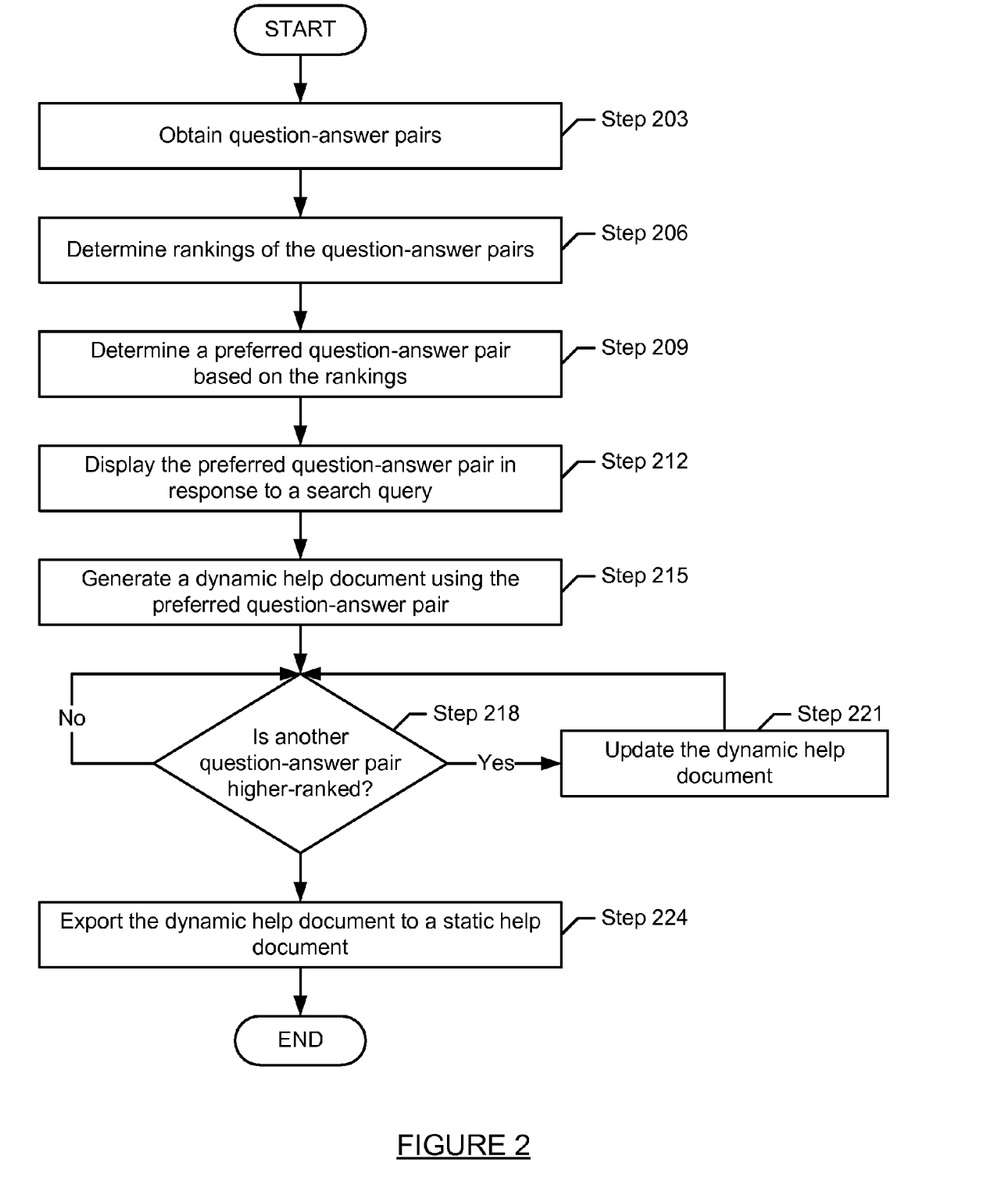
FIG. 2 shows a flowchart of a method for generating a dynamic help document in accordance with one or more embodiments of the invention.

FIG. 2 shows a flowchart of a method for generating a dynamic help document in accordance with one or more embodiments of the invention. In one or more embodiments of the invention, one or more of the steps shown in FIG. 2 may be omitted, repeated, and/or performed in a different order than the order shown in FIG. 2. Accordingly, embodiments of the invention should not be considered limited to the specific arrangement of steps shown in FIG. 2.

In one or more embodiments of the invention, in Step 203, question-answer pairs are obtained. The question-answer pairs may be obtained from many different sources, or combinations thereof. For example, the question-answer pairs may include content from a message board, a live chat session, a FAQ document, an indexed web page, a scanned application manual, or any other type of source that includes content in question-answer form. In one or more embodiments of the invention, the question-answer pairs include questions and corresponding answers that relate to features of a client-server application.

In one or more embodiments of the invention, in Step 206, rankings of the question-answer pairs are determined. Specifically, in one or more embodiments of the invention, the rankings are based on user feedback about the question-answer pairs. The user feedback may take many different forms. As one example, users may be able to assign a scaled value to each question-answer pair (e.g., a value from one to five, a letter grade, a number of stars, or any other type of value on a scale having both a low end and a high end).

As another example, the user feedback may include textual comments associated with the question-answer pair (e.g., feedback including terms such as "useful," "confusing," "irrelevant," "outstanding," "thank you," or any other terms that may be interpreted as assigning value to the question-answer pairs). The textual comments may then be parsed to determine the incidence of each such term, and rankings may be determined by assigning significance to those terms (for example, by assigning positive terms a positive numerical value and negative terms a negative numerical value).

Further, in one or more embodiments of the invention, questions and answers are ranked independently of each other. For example, one question-answer pair may have a well-formulated question, but a poorly-formulated answer. Another question-answer pair relating to the same topic may have a poorly-formulated question but a well-formulated answer. In such cases, the question from the first question-answer pair may receive a high ranking, and the answer from the second question-answer pair may also receive a high ranking.

In view of the above, those skilled in the art will appreciate that each question-answer pair may be ranked in many different ways. In one or more embodiments of the invention, ranking techniques may be used that are described in U.S. patent application Ser. No. 12/112,516, entitled "Domain Based Interactive Search," in the names of Igor A. Podgorny, Amit Rohatgi, Floyd Morgan, and Paul Coletta, incorporated by reference in its entirety above.

Whatever technique is used to rank each question-answer pair, the relative rankings of two question-answer pairs may be determined by comparing the individual rankings of each of those question-answer pairs (or the component questions and answers thereof). For example, a question-answer pair that receives, on average, four-star reviews from users may have a higher ranking than a question answer pair that receives, on average, three-star reviews.

Further, rankings may be weighted based on the amount of user feedback available for each question-answer pair. That is, a question-answer pair with a single five-star review may still be ranked lower than a question-answer pair with an average of four stars from over one hundred reviews. As additional user feedback is obtained for a given question-answer pair, the user feedback may be considered increasingly representative of overall user opinion.

In one or more embodiments of the invention, in Step 209, a preferred question-answer pair is determined based on the rankings. In one or more embodiments of the invention, the preferred question-answer pair is simply the question-answer pair with the highest relative ranking. For example, if multiple question-answer pairs exist for a given topic, the preferred question-answer pair may be the highest-ranked question-answer pair in that group. Further, the preferred question-answer pair may include a high-ranked question from one question-answer pair and a high-ranked answer from another question-answer pair. The use of questions and answers from different question-answer pairs is discussed below with respect to FIG. 3.

In one or more embodiments of the invention, in Step 212, the preferred question-answer pair is displayed in response to a search query. Specifically, because the preferred question-answer pair has received the most positive user feedback, that question-answer pair may be elevated to the top of search results, where the search query relates to the topic of the question-answer pair. In this manner, the user conducting the search is more likely to obtain relevant help in response to the search query. Similar uses of ranked searches are discussed in U.S. patent application Ser. No. 12/112,516, entitled "Domain Based Interactive Search," in the names of Igor A. Podgorny, Amit Rohatgi, Floyd Morgan, and Paul Coletta, incorporated by reference in its entirety above.

In one or more embodiments of the invention, in Step 215, a dynamic help document is generated using the preferred question-answer pair. The dynamic help document may take many different forms. In one or more embodiments of the invention, the dynamic help document is a FAQ document. Specifically, in one or more embodiments of the invention, generating the dynamic help document involves using the preferred question-answer pair to address a particular topic (i.e., the topic to which the preferred question-answer pair relates) in the FAQ document.

In one or more embodiments of the invention, in Step 218, a determination is made whether another question-answer pair is higher-ranked than the preferred question-answer pair. Specifically, as additional user feedback is obtained, the relative rankings of question-answer pairs may change over time. If, for a particular help topic, a different question-answer pair develops a higher ranking, that question-answer pair may then be considered the preferred question-answer pair.

If another question-answer pair has a higher ranking (i.e., it is now the preferred question-answer pair), then in one or more embodiments of the invention, in Step 221, the dynamic help document is updated. Specifically, to update the dynamic help document, the previous preferred question-answer pair is replaced with the higher-ranked question-answer pair identified in Step 218. Updating the dynamic help document in this manner helps ensure that the most up-to-date, user-preferred help is available to users.

In one or more embodiments of the invention, the dynamic help document is updated as soon as a new preferred question-answer pair is identified.

Alternatively, the dynamic help document may be updated periodically (for example, a certain number of times per minute, hour, day, etc.). As still another alternative, the dynamic help document may be updated when a certain number of new preferred question-answer pairs are identified for different help topics. Many different types of criteria may be used to determine when to update the dynamic help document.

If no higher-ranked question-answer pair is available, then in one or more embodiments of the invention, the method proceeds by waiting until a higher-ranked question-answer pair is available. That is, the determination of Step 218 is repeated until a higher-ranked question-answer pair is identified. In one or more embodiments of the invention, the determination of Step 218 is repeated periodically, for example a certain number of times per minute, hour, day, etc. Alternatively, the determination of Step 218 may be triggered by obtaining additional user feedback.

Those skilled in the art will appreciate that a dynamic help document generated in the manner described above may change frequently, as additional user feedback is obtained. However, in some cases, a static help document is also helpful—for example, as a distributable user guide for a particular version of the application. Accordingly, in one or more embodiments of the invention, in Step 224, the dynamic help document is exported to generate a static help document. The static help document may be a formatted text document, hypertext markup language (HTML), a portable document format (PDF) file, or any other type of static document format.

Figure 3:
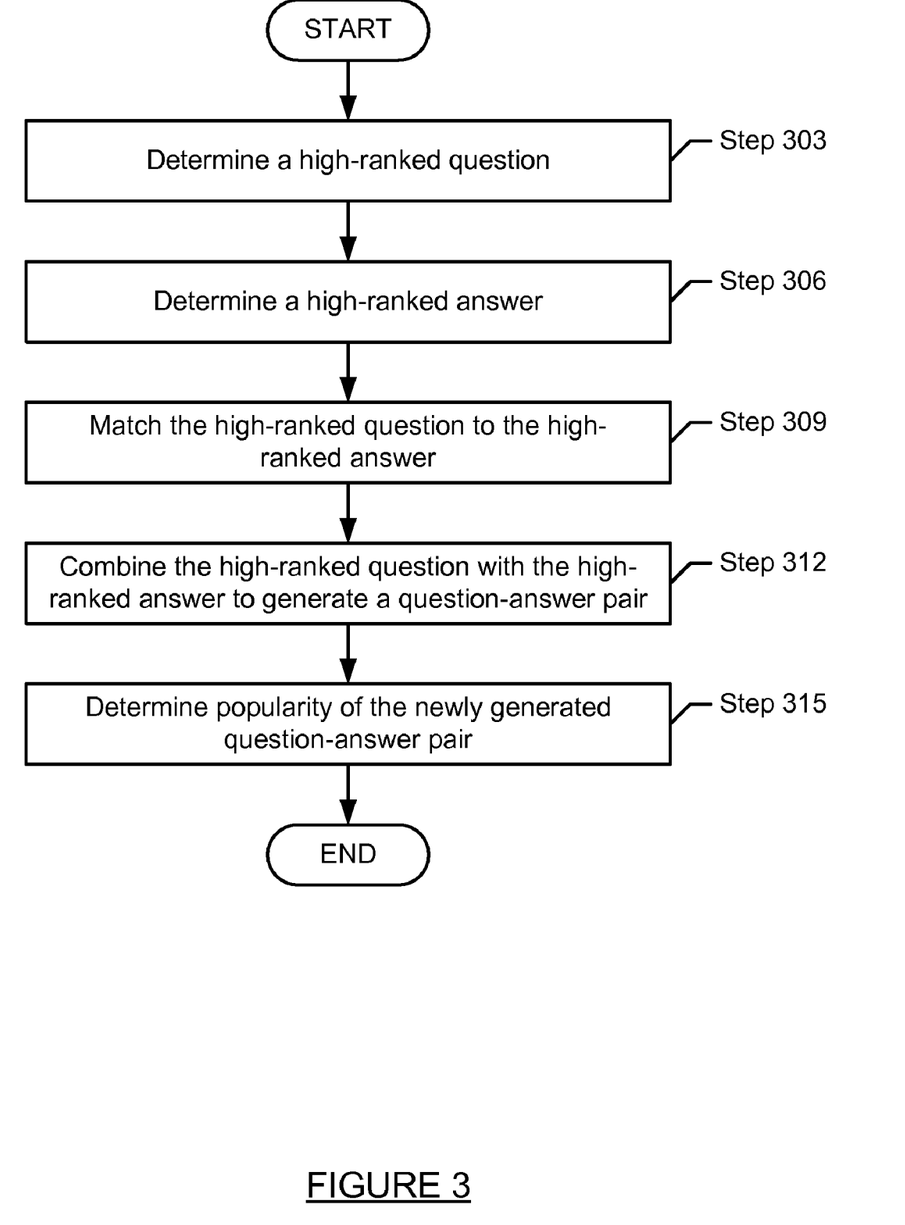
FIG. 3 shows a flowchart of a method for determining a preferred question-answer pair in accordance with one or more embodiments of the invention.

As noted above, the preferred question-answer pair determined in Step 209 may include a high-ranked question from one question-answer pair and a high-ranked answer from another question-answer pair. FIG. 3 shows a flowchart of a method for determining a preferred question-answer pair in accordance with one or more embodiments of the invention. In one or more embodiments of the invention, one or more of the steps shown in FIG. 3 may be omitted, repeated, and/or performed in a different order than the order shown in FIG. 3. Accordingly, embodiments of the invention should not be considered limited to the specific arrangement of steps shown in FIG. 3.

In one or more embodiments of the invention, in Step 303, a high-ranked question is determined. Specifically, in one or more embodiments of the invention, questions and answers are ranked separately. Accordingly, a given question may be assigned a high ranking even if the corresponding answer has a lower ranking. Similarly, in one or more embodiments of the invention, Step 306, a high-ranked answer is determined.

In one or more embodiments of the invention, in Step 309, the high-ranked question is matched to the high-ranked answer. In one or more embodiments of the invention, the high-ranked question and the high-ranked answer are matched using natural language comparisons to identify similarities. For example, the question and answer may each include the term "home office deduction." Based on this phrase being present in both locations, there may be a reasonable expectation that the high-ranked answer includes information that addresses the high-ranked question.

In one or more embodiments of the invention, in Step 312, the high-ranked question and the high-ranked answer are combined to generate a preferred question-answer pair. Further, to ensure that the combination is a valid and helpful question-answer pair, in one or more embodiments of the invention, in Step 315, popularity of the newly generated question-answer pair is determined. Specifically, the newly generated question-answer pair may be provided to users in the same location as the original question-answer pairs (i.e., those from which the preferred question-answer pair was determined). The popularity (based on relative rankings) of the newly generated question-answer pair may thereby be tested, based on user rankings of the newly generated question-answer pair. If the question-answer pair receives sufficiently high rankings, then the question-answer pair may confidently be considered the preferred question-answer pair.

Figure 4:
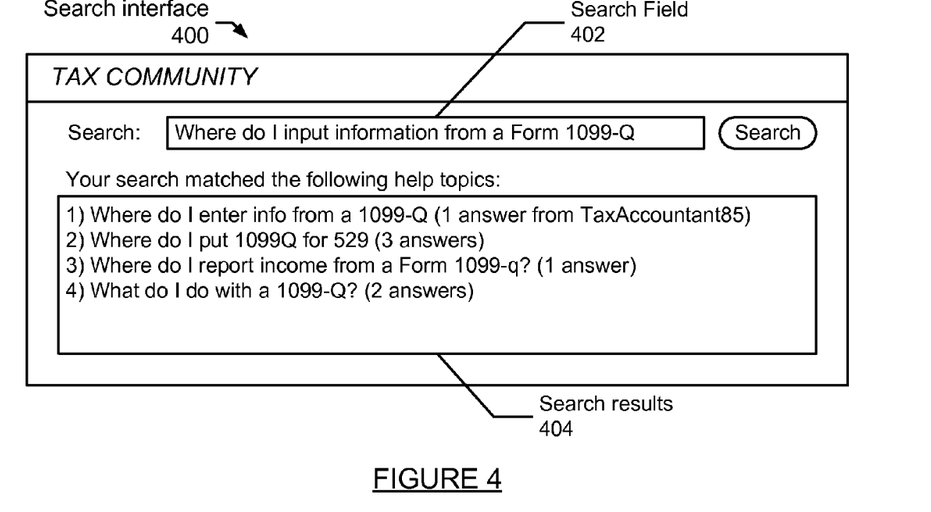
FIG. 4 shows an example of a search interface in accordance with one or more embodiments of the invention.

FIG. 4 shows an example of a search interface (400) in accordance with one or more embodiments of the invention. The search interface (400) includes a search field (402) that allows users to enter search terms for obtaining help about an application. Matching question-answer pairs are then displayed as search results (404). In one or more embodiments of the invention, only the questions are displayed in the search results (404), and users must select a question to view the corresponding answer. Further, multiple question-answer pairs may be available for the same search term. Accordingly, the search results (404) may include multiple question-answer pairs to choose from. The question-answer pairs may be ordered according to ranking, most recent to least recent, or any other suitable sorting criterion. In one or more embodiments, when a user views a full question-answer pair (not shown), the user may then be able to rank the question-answer pair as discussed above. In this manner, users are able to provide feedback as to the helpfulness of each question-answer pair. This user feedback may then serve as a basis for generating a dynamic help document, as discussed above.

Figure 5:
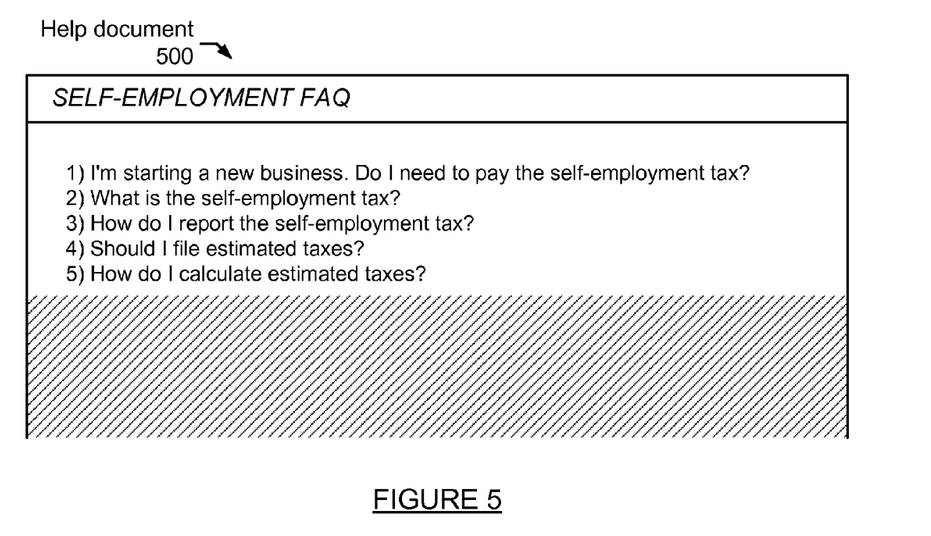
FIG. 5 shows an example of a help document in accordance with one or more embodiments of the invention.

FIG. 5 shows an example of a help document (500) in accordance with one or more embodiments of the invention. The help document (500) may be a dynamic help document, or may be a static help document. The help document (500) includes multiple question-answer pairs that provide help about an application. In FIG. 5, for ease of illustration, only the question components of the question-answer pairs are shown. The corresponding answers may be provided below the questions, the hash-marked area. Alternatively, the corresponding answers may directly follow each of the questions. Those skilled in the art will appreciate that help documents may be formatted in many different ways.

In general, embodiments of the invention provide a method and system for generating a dynamic help document, where the question-answer pairs shown in the dynamic help document are those that are deemed most useful, based on user feedback. Thus, embodiments of the invention help facilitate the delivery of the most up-to-date and relevant application help available. Because the process of generating the dynamic help document is automated, embodiments of invention may help reduce customer support costs. Further, the preferred question-answer pairs may be exported to a static help document. Depending on the marketability of the content, the preferred question-answer pairs may even be sold to a third party, based on the marketable knowledge that users have already 'vetted' the content contained therein.

Figure 6:
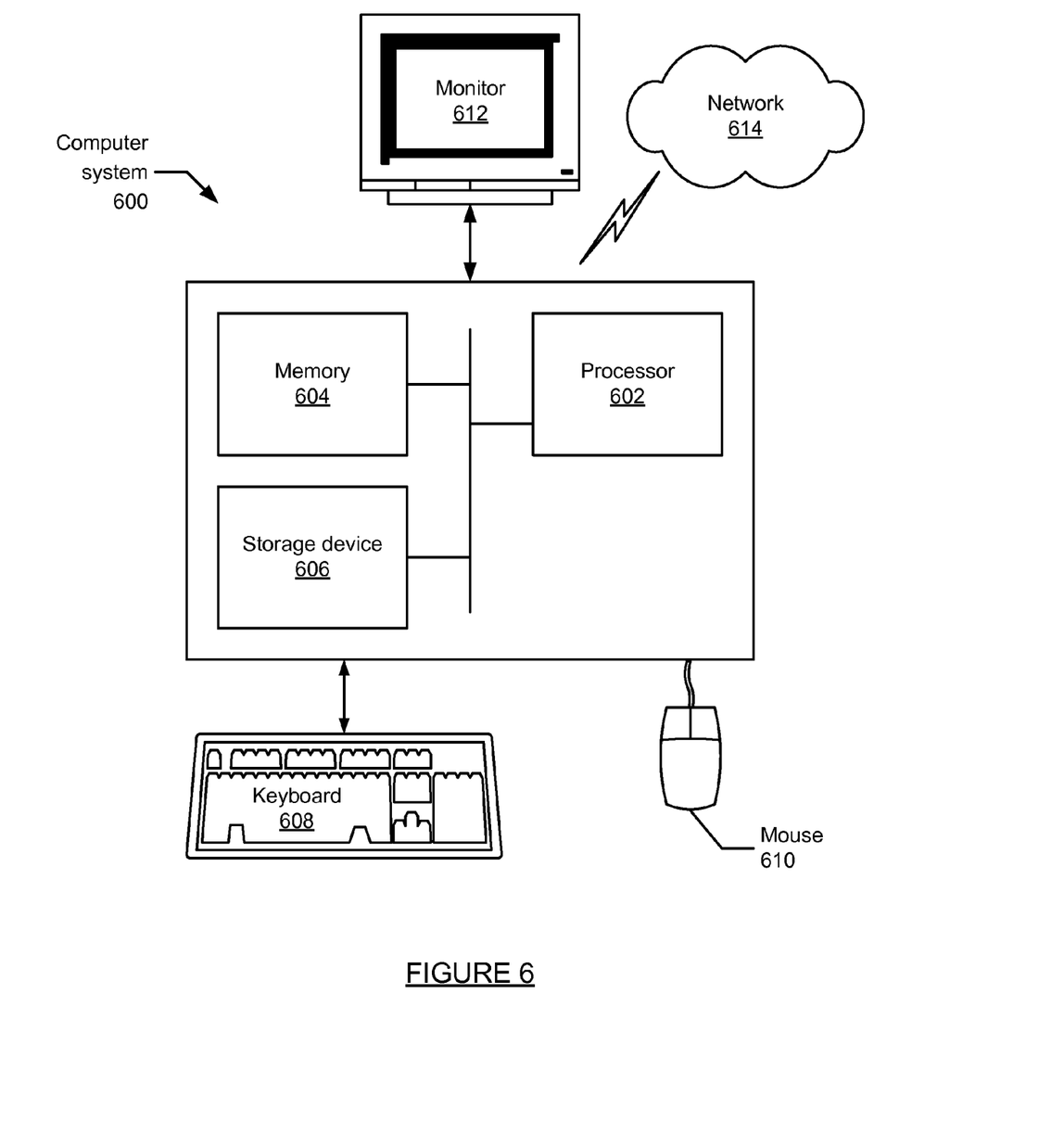
FIG. 6 shows a diagram of a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., application client, application server, help subsystem, data repository, question-answer pairs, user feedback, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a dynamic help document comprising:
    obtaining, by a hardware processor, a first question-answer pair associated with a topic of a client-server application and comprising a first question and a first answer;
    obtaining, by the hardware processor, a second question-answer pair associated with the topic and comprising a second question and a second answer;
    identifying, by the hardware processor, a numerical ranking of the first question and a numerical ranking of the first answer;
    identifying, by the hardware processor, a numerical ranking of the second question and a numerical ranking of the second answer;
    generating, by the hardware processor and in response to the numerical ranking of the first question exceeding the numerical ranking of the second question and the numerical ranking of the second answer exceeding the numerical ranking of the first answer, a new question-answer pair comprising the first question and the second answer;

adding, by the hardware processor, the new question-answer pair to a plurality of question-answer pairs associated with the client-server application;
determining, by the hardware processor, a plurality of numerical rankings for the plurality of question-answer pairs based on user feedback about the plurality of question-answer pairs;
determining, by the hardware processor, a first preferred question-answer pair based on the plurality of numerical rankings for the plurality of question-answer pairs;
generating, by the hardware processor, the dynamic help document using the first preferred question-answer pair;
updating, by the hardware processor, the plurality of numerical rankings for the plurality of question-answer pairs based on additional user feedback about the plurality of question-answer pairs;
determining, by the hardware processor, a second preferred question-answer pair based on the plurality of numerical rankings for the plurality of question-answer pairs after the plurality of numerical rankings are updated; and
updating, by the hardware processor, the dynamic help document by replacing the first preferred question-answer pair with the second preferred question-answer pair.

2. The method of claim 1, further comprising:
exporting the dynamic help document to generate a static help document.

3. The method of claim 1, further comprising:
displaying the first preferred question-answer pair in response to a search query in the application.

4. The method of claim 1, wherein the client-server application is an online tax preparation application.

5. A computer system comprising:
a processor;
a memory; and
a help subsystem resident in memory, operating under control of the processor, and configured to:
obtain a first question-answer pair associated with a topic associated with a client-server application and comprising a first question and a first answer,
obtain a second question-answer pair associated with the topic and comprising a second question and a second answer,
identify a numerical ranking of the first question and a numerical ranking of the first answer,
identify a numerical ranking of the second question and a numerical ranking of the second answer,
generate, in response to the numerical ranking of the first question exceeding the numerical ranking of the second question and the numerical ranking of the second answer exceeding the numerical ranking of the first answer, a new question-answer pair comprising the first question and the second answer,
add the new question-answer pair to a plurality of question-answer pairs associated with the client server application,
determine a plurality of numerical rankings for the plurality of question-answer pairs based on user feedback about the plurality of question-answer pairs,
determine a first preferred question-answer pair based on the plurality of numerical rankings for the plurality of question-answer pairs,
generate the dynamic help document using the first preferred question-answer pair,
update the plurality of numerical rankings for the plurality of question-answer pairs based on additional user feedback about the plurality of question-answer pairs,
determine a second preferred question-answer pair based on the plurality of numerical rankings for the plurality of question-answer pairs after the plurality of numerical rankings are updated, and
update the dynamic help document by replacing the first preferred question-answer pair with the second preferred question-answer pair.

6. The computer system of claim 5, wherein the help subsystem is further configured to:
export the dynamic help document to generate a static help document.

7. The computer system of claim 5, wherein the help subsystem is further configured to:
provide the first preferred question-answer pair in response to a search query in the application.

8. The computer system of claim 5, wherein the client-server application is an online tax preparation application.

9. A non-transitory computer-readable medium comprising instructions executable on a hardware processor for generating a dynamic help document, the instructions comprising functionality to:
obtain a first question-answer pair associated with a topic and a client-server application and comprising a first question and a first answer,
obtain a second question-answer pair associated with the same topic and comprising a second question and a second answer,
identify a numerical ranking of the first question and a numerical ranking of the first answer,
identify a numerical ranking of the second question and a numerical ranking of the second answer,
generate, in response to the numerical ranking of the first question exceeding the numerical ranking of the second question and the numerical ranking of the second answer exceeding the numerical ranking of the first answer, a new question-answer pair comprising the first question and the second answer,
add the new question-answer pair to a plurality of question-answer pairs associated with the client server application,
determine a plurality of numerical rankings for the plurality of question-answer pairs based on user feedback about the plurality of question-answer pairs,
determine a first preferred question-answer pair based on the plurality of numerical rankings for the plurality of question-answer pairs,
generate the dynamic help document using the first preferred question-answer pair,
update the plurality of numerical rankings for the plurality of question-answer pairs based on additional user feedback about the plurality of question-answer pairs,
determine a second preferred question-answer pair based on updated the plurality of numerical rankings for the plurality of question-answer pairs after the plurality of numerical rankings are updated, and
update the dynamic help document by replacing the first preferred question-answer pair with the second preferred question-answer pair.

10. The non-transitory computer-readable medium of claim 9, wherein executable instructions further comprise instructions to:
export the dynamic help document to generate a static help document.

11. The non-transitory computer-readable medium of claim 9, wherein executable instructions further comprise instructions to:
   display the first preferred question-answer pair in response to a search query in the application.

12. The non-transitory computer-readable medium of claim 9, wherein the client-server application is an online tax preparation application.

* * * * *